(12) United States Patent
Hodges et al.

(10) Patent No.: US 10,941,472 B2
(45) Date of Patent: Mar. 9, 2021

(54) SYSTEMS AND METHODS FOR DRAWING HIGH ASPECT RATIO METALLIC GLASS-BASED MATERIALS

(71) Applicant: Metal Morphing Technologies, Inc., North Branford, CT (US)

(72) Inventors: Thomas M. Hodges, North Haven, CA (US); John Brooke Delfini, Branford, CA (US)

(73) Assignee: Metal Morphing Technologies, Inc., North Branford, CT (US)

( * ) Notice: Subject to any disclaimer, the term of this patent is extended or adjusted under 35 U.S.C. 154(b) by 885 days.

(21) Appl. No.: 15/530,407

(22) Filed: Jan. 9, 2017

(65) Prior Publication Data

US 2017/0197236 A1 Jul. 13, 2017

Related U.S. Application Data

(60) Provisional application No. 62/276,629, filed on Jan. 8, 2016.

(51) Int. Cl.
*C22C 45/00* (2006.01)
*C03B 37/02* (2006.01)
(Continued)

(52) U.S. Cl.
CPC .............. *C22C 45/00* (2013.01); *B21C 1/003* (2013.01); *B21C 9/00* (2013.01); *C03B 25/00* (2013.01);
(Continued)

(58) Field of Classification Search
CPC ........... C22C 45/00; B21C 1/003; B21C 9/00; C03B 25/00; C03B 37/0124; C03B 37/02;
(Continued)

(56) References Cited

U.S. PATENT DOCUMENTS 5,242,476 A 9/1993 Bartel et al.
5,284,499 A 2/1994 Harvey et al.
(Continued)

FOREIGN PATENT DOCUMENTS

WO 1988010241 A1 12/1988
WO 2017120123 A1 7/2017

OTHER PUBLICATIONS

International Preliminary Report on Patentability for International Application No. PCT/US2017/000003, Report issued Jul. 10, 2018, dated Jul. 19, 2018, 8 Pgs.
(Continued)

*Primary Examiner* — Alexandra M Moore
(74) *Attorney, Agent, or Firm* — KPPB LLP

(57) ABSTRACT

Systems and methods for drawing high aspect ratio metallic glass-based materials are provided. Methods of drawing a high aspect ratio metallic glass-based material are premised on stably drawing high aspect ratio metallic glass-based material from a preform metallic glass-based composition, accounting for the relationships between: the desired formation of an amorphous structure that is substantially homogenous along the majority of the length of the drawn high aspect ratio material; the desired final geometry of the drawn high aspect ratio material; the nature of the force that is used to draw the molten metallic glass-based composition; the velocity at which the high aspect ratio material is drawn; the viscosity profile of the material along its length as it is being drawn; and/or the effect of temperature on the metallic glass-based material. A precise thermal treatment is imposed along the forming length of the drawn material so as to enable a steady state drawing process, the precise thermal treatment being based on: the desire to develop a substantially same amorphous structure along the length of the drawn material; the desired final geometry for the drawn material; the nature of the force used to draw the material;
(Continued)

the velocity at which the material is being drawn; and/or the thermal treatment's impact on the viscosity profile of the material along its length as it is being drawn.

16 Claims, 13 Drawing Sheets

(51) Int. Cl.
| | |
|---|---|
| *C03B 25/10* | (2006.01) |
| *C03B 37/022* | (2006.01) |
| *B21C 9/00* | (2006.01) |
| *C03B 25/00* | (2006.01) |
| *B21C 1/00* | (2006.01) |
| *C03B 37/025* | (2006.01) |
| *C03B 25/06* | (2006.01) |
| *C03B 35/16* | (2006.01) |
| *C03B 37/012* | (2006.01) |
| *F27B 1/08* | (2006.01) |
| *F27B 1/26* | (2006.01) |

(52) U.S. Cl.
CPC .............. *C03B 25/06* (2013.01); *C03B 25/10* (2013.01); *C03B 35/16* (2013.01); *C03B 37/0124* (2013.01); *C03B 37/02* (2013.01); *C03B 37/022* (2013.01); *C03B 37/0256* (2013.01); *C03B 2203/04* (2013.01); *C03B 2203/16* (2013.01); *C03B 2205/30* (2013.01); *C03B 2205/40* (2013.01); *F27B 1/08* (2013.01); *F27B 1/26* (2013.01)

(58) Field of Classification Search
CPC .............. C03B 37/022; C03B 37/0256; C03B 2203/04; C03B 2203/16; C03B 2205/30; C03B 2205/40; F27B 1/08; F27B 1/26
See application file for complete search history.

(56) References Cited

U.S. PATENT DOCUMENTS

| | | | |
|---|---|---|---|
| 2003/0086670 A1 | 5/2003 | Moridaira et al. | |
| 2005/0281521 A1* | 12/2005 | Oku | ............ C03B 37/02727 385/123 |
| 2006/0191293 A1* | 8/2006 | Kuczma | ............ C03B 37/02727 65/384 |

OTHER PUBLICATIONS

International Search Report and Written Opinion for International Application No. PCT/US2017/000003, Search completed Apr. 19, 2017, dated May 10, 2017, 12 Pgs.

Vormelker et al., "Effects of Test Temperature and Loading Conditions on the Tensile Properties of a Zr-based Bulk Metallic Glass", Metallurgical and Materials Transactions, Aug. 2008, vol. 39A, pp. 1922-1934.

Yi et al., "Micro-and Nanoscale Metallic Glassy Fibers", Advanced Engineering Materials, 2010, vol. 12, No. 11, pp. 1117-1122, doi: 10.1002/adem.201000204.

* cited by examiner

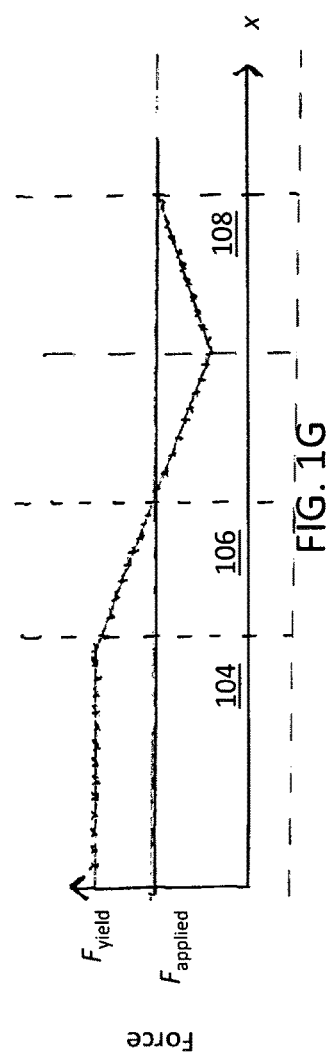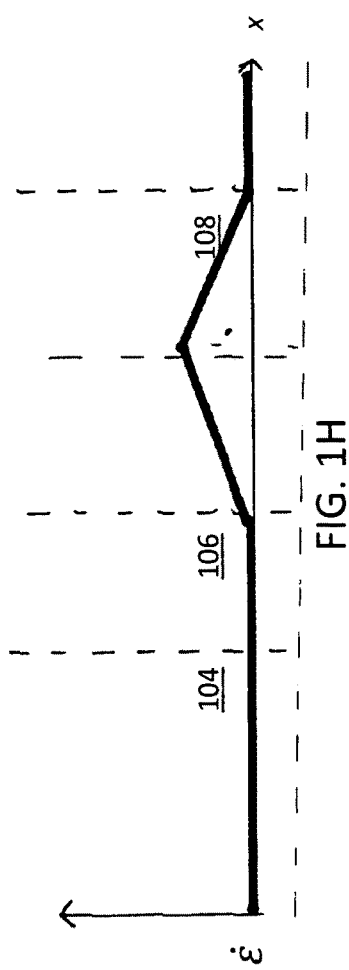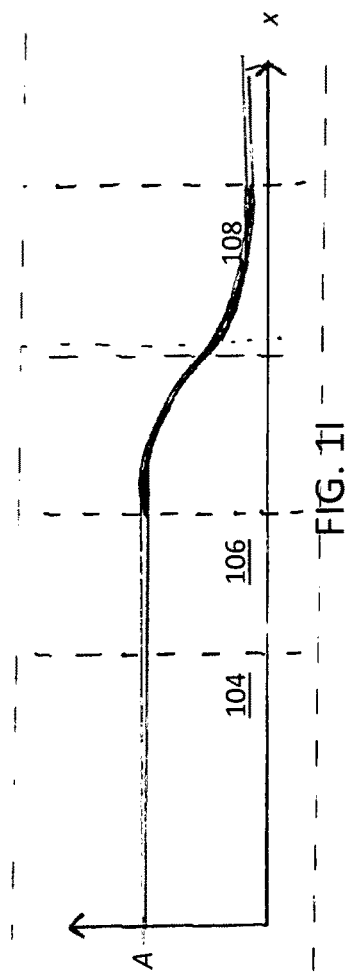

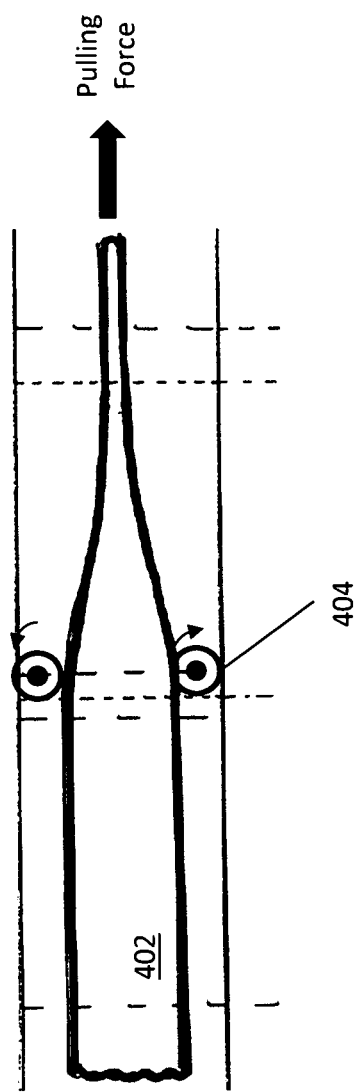

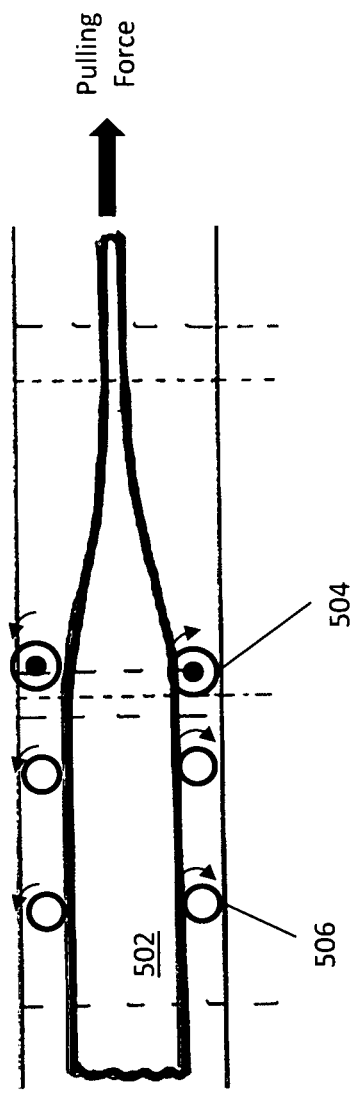

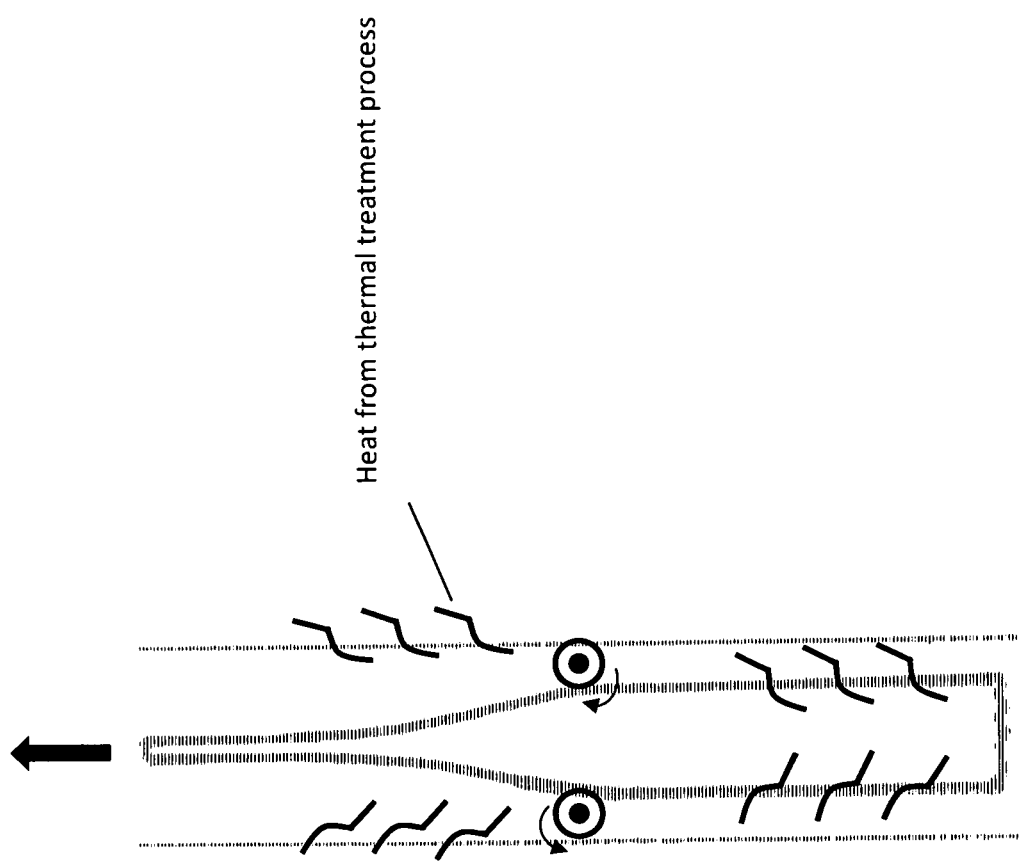

SYSTEMS AND METHODS FOR DRAWING HIGH ASPECT RATIO METALLIC GLASS-BASED MATERIALS

CROSS-REFERENCE TO RELATED APPLICATIONS

The present application claims priority to U.S. Provisional Patent Application No. 62/276,629, filed Jan. 8, 2016, the disclosure of which is incorporated herein by reference.

FIELD OF THE INVENTION

The present invention generally relates to drawing high-aspect ratio metallic glass-based materials.

BACKGROUND

Within the context of the instant application, drawing generally refers to material forming processes that involve applying tension to a given stock material to controllably stretch the stock material and correspondingly cause a reduction in cross-sectional area. In many instances, a given stock material is heated so that it softens, and a tensile force is thereafter (or concurrently) applied to stretch the softened material; correspondingly, the cross-sectional area of the material is reduced to accommodate the stretching. Optical fibers from glass are often fabricated using this technique. In several instances, the stock material is pulled through a die that is implemented to further guide the reduction in cross-sectional area. Additionally, in many instances, drawing processes are implemented without heating the stock material to soften it. For example, in several instances the stock material is pulled through a die at room temperature.

SUMMARY OF THE INVENTION

Systems and methods in accordance with embodiments of the invention draw high-aspect ratio metallic-glass based materials.

Many embodiments are directed to methods of drawing a high aspect ratio metallic glass-based material including:
  providing an elongated body of a metallic glass-based feedstock material;
  heating portions of the elongated body of the metallic glass-based feedstock material sequentially through at least three consecutive thermal processing regions such that different portions of the elongated body are exposed to different thermal processing regions simultaneously;
  wherein:
    in a first thermal processing region, at least one pre-heated portion of the elongated body of the metallic glass-based feedstock material is heated to a temperature at around the glass transition temperature of the metallic glass-based feedstock material;
    in a second thermal processing region, at least one heated portion of the elongated body of the metallic glass-based feedstock material having passed through the first thermal processing region is heated to a temperature above the glass transition temperature of the metallic glass-based feedstock material;
    in a third thermal processing region, the temperature at least one post-heated portion of the metallic glass-based material having passed through the first and second thermal processing regions are controllably reduced to a temperature around the glass transition temperature of the metallic glass-based feedstock material;
    drawing an elongated high aspect ratio metallic glass-based object from the at least one post-heated portion of the metallic glass-based feedstock material by applying a tensile force thereto, wherein the tensile force is sufficient to cause the post-heated portion of the metallic glass-based feedstock material to yield and stretch longitudinally such that the cross-sectional area of the at least one post-heated portion of the metallic glass-based feedstock material is reduced along the longitudinal length thereof; and
    wherein the metallic glass-based material retains an amorphous structure throughout its exposure to the three consecutive thermal processing regions.

In many embodiments the temperature of the post-heated portions of the metallic glass-based feedstock material is reduced to a temperature around the glass-transition temperature such that for substantially every cross-sectional slice within the post-heated portion of the metallic glass-based feedstock material the product of the cross-sectional area, the rate of strain, and the viscosity, is substantially equal to one-third of the applied tensile force.

In still many embodiments the metallic glass-based feedstock material is moved through the plurality of thermal processing regions at a first velocity and the elongated high aspect ratio metallic glass-based object is drawn out of the post-heat portion of the metallic glass-based feedstock material at a second velocity such that product of the first velocity and the cross-sectional area of the metallic glass-based feedstock material is equal to the second velocity and the cross-sectional area of the high aspect ratio metallic glass based-object are equal.

In yet many embodiments the heating of the portions of the metallic glass-based feedstock material induces a viscosity gradient along at least a portion of the elongated body of the metallic glass-based feedstock material. In some such embodiments, the viscosity of the at least one heated portion of the metallic glass-based feedstock material is sufficiently low such that the yield force of the at least one heated portion is less than the tensile force. In still some such embodiments the viscosity of each cross-sectional slice of the heated portion of the elongated body of the metallic glass-based feedstock material is equal to the quotient of the tensile force and the product of three time the cross-sectional area of the cross-sectional slice and the strain rate. In yet some such embodiments, the yield force along the elongated body is made to vary at least across the heated and post-heated portions of the metallic glass-based feedstock material.

In still yet many embodiments the drawing of the high aspect ratio metallic glass based-object is a steady-state process.

In still yet many embodiments the metallic glass-based feedstock material has a critical casting thickness of at least 1 mm.

In still yet many embodiments the metallic glass-based feedstock material is a metallic glass matrix composite.

In still yet many embodiments the cross-section of the elongated body of the metallic glass-based feedstock material is selected from the group consisting of prism-like, square, circular, and rectangular.

In still yet many embodiments the elongated body of the metallic glass-based feedstock material has a hollow center.

In still yet many embodiments the elongated body of the metallic glass-based feedstock material is fed through the heating portions by application of a force to the elongated body.

In still yet many embodiments the method further includes a start-up step wherein the velocity along the length of the elongated body is initially equal and the tensile force applied to the elongated body is increased gradually to the yield point of the material as the temperature of at least one portion of metallic glass-based feedstock material is increased to above the glass transition temperature.

In still yet many embodiments the method further includes applying a shaping force to the heated portion of the elongated body of the metallic glass-based feedstock material to change the final cross-sectional geometry of the elongated high aspect ratio metallic glass-based object.

In still yet many embodiments the method further includes more than three thermal processing regions are used.

Various embodiments are directed to methods of drawing a high aspect ratio metallic glass-based material including:
  providing an elongated body of a metallic glass-based material;
  raising the temperature of at least some portions of the elongated body of metallic glass-based material to above the respective glass transition temperature of the metallic glass-based material;
  applying a tensile force to those portions of the elongated body of metallic glass-based material having a temperature greater than the glass transition temperature, wherein the tensile force is greater than the yield force of the heated portions of the metallic glass-based material to draw a high aspect ratio metallic glass-based object therefrom such that the cross-sectional area of the high aspect ratio metallic glass-based object is gradually reduced relative to the cross-sectional area of the elongated body; and
  controlling the viscosity of those portions of the metallic glass-based material that are being drawn such that for substantially every cross-sectional slice of the elongated body of the metallic glass-based material the applied tensile force is equal to the product of 3 time the cross-sectional area, the rate of strain, and the viscosity;
  wherein the metallic glass-based material retains an amorphous structure throughout the drawing process.

Some embodiments are directed to systems for drawing a high aspect ratio metallic glass-based material including:
  an elongated sample pathway comprising along its length at least three sequentially arranged thermal processing regions wherein:
    a first thermal processing region is configured to pre-heat a portion of a metallic glass-based feedstock material disposed therein to a temperature at around the glass transition temperature of the metallic glass-based feedstock material;
    a second thermal processing region configured to heat a portion of a metallic glass-based feedstock material disposed therein to a temperature above the glass transition temperature of the metallic glass-based feedstock material;
    a third thermal processing region configured to heat a portion of a metallic glass-based material disposed therein to a temperature around the glass transition temperature of the metallic glass-based feedstock material;
  a feed mechanism configured to apply a tensile force to a metallic glass-based feedstock material disposed within the sample pathway, wherein the tensile force is sufficient to cause the heated portion of the metallic glass-based feedstock material to yield and stretch longitudinally such that the cross-sectional area of the at least one post-heated portion of the metallic glass-based feedstock material is reduced along the longitudinal length thereof to form an elongated high aspect ratio metallic glass-based object; and
  wherein the plurality of temperature regions are configured such that a metallic glass-based material fed therethrough retains an amorphous structure throughout its exposure to the three consecutive thermal processing regions.

In some embodiments the feed mechanism comprises a pulling force for applying the tensile force to an elongated body of the metallic glass-based feedstock material disposed within the elongated sample pathway.

In still some embodiments the feed mechanism comprises at least one guide roller for facilitating the feeding of an elongated body of the metallic glass-based feedstock material through the elongated sample pathway. In some such embodiments the guide roller constrains the motion of the elongated body of the metallic glass-based feedstock material through the elongated sample pathway. In still some such embodiments the guide roller encourages the motion of the elongated body of the metallic glass-based feedstock material through the elongated sample pathway. In yet some such embodiments the system further includes a take-up mechanism attached to the pulling force such that the tensile force applied to the elongated body is increased gradually to the yield point of the material as the temperature of at least one portion of metallic glass-based feedstock material is increased to above the glass transition temperature. In yet some such embodiments the take-up mechanism comprises a spring. In still yet some such embodiments the guide roller is grooved to conform to the outer contour of an elongated sample disposed within the elongated sample pathway.

In yet some embodiments the sample pathway is oriented vertically.

In still yet some embodiments the system includes more than three thermal processing regions.

In still yet some embodiments the system includes a shaping tool for applying a shaping force to the heated portion of the elongated body of the metallic glass-based feedstock material to change the final cross-sectional geometry of the elongated high aspect ratio metallic glass-based object.

In still yet some embodiments the temperature of the post-heated region is selected such that for substantially every cross-sectional slice within the post-heated portion of the metallic glass-based feedstock material the product of the cross-sectional area, the rate of strain, and the viscosity, is substantially equal to one-third of the applied tensile force.

In still yet some embodiments the feed mechanism is configured to move a metallic glass-based feedstock material through the plurality of thermal processing regions at a first velocity and to draw the elongated high aspect ratio metallic glass-based object out of the post-heat portion of the metallic glass-based feedstock material at a second velocity such that product of the first velocity and the cross-sectional area of the metallic glass-based feedstock material is equal to the second velocity and the cross-sectional area of the high aspect ratio metallic glass based-object are equal.

In still yet some embodiments the metallic glass-based feedstock material has a critical casting thickness of at least 1 mm.

In still yet some embodiments the metallic glass-based feedstock material is a metallic glass matrix composite.

In still yet some embodiments the cross-section of the metallic glass-based feedstock material is selected from the group consisting of prism-like, square, circular, and rectangular.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 1A-1I illustrate a fundamental drawing configuration, including pertinent operation data, for drawing high aspect ratio metallic glass-based materials in accordance with certain embodiments of the invention.

FIG. 4 illustrates the implementation of guide rollers to facilitate the feeding of provided metallic glass-based material through a thermal processing regimen in accordance with certain embodiments of the invention.

FIG. 5 illustrates the implementation of movement rollers to facilitate the feeding of provided metallic glass-based material through a thermal processing regimen in accordance with certain embodiments of the invention.

FIG. 11 illustrates drawing a metallic glass-based material in a vertical orientation in accordance with certain embodiments of the invention.

DETAILED DESCRIPTION

Figure 1A:
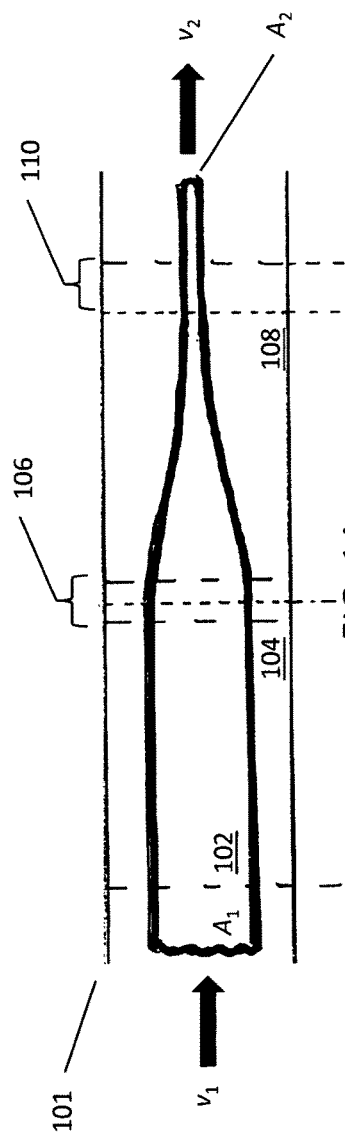

Turning now to the drawings, systems and methods for drawing high aspect ratio metallic glass-based materials are illustrated. Metallic glasses, also known as amorphous alloys, embody a relatively new class of materials that is receiving much interest from the engineering and design communities. Metallic glasses are characterized by their disordered atomic-scale structure in spite of their metallic constituent elements—i.e. whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, metallic glass materials lend themselves to relatively easy processing in certain respects. For example, the forming of metallic glass materials can be compatible with injection molding processes. Thus, for example, metallic glass compositions can be cast into desired shapes.

Nonetheless, the practical implementation of metallic glasses presents certain challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g. on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g. greater than 1 mm). These metallic glass compositions that can be made to be thicker are known as 'bulk metallic glasses' ("BMGs"). As can be appreciated, such BMGs can be better suited for investment molding operations.

In addition to the development of BMGs, 'bulk metallic glass matrix composites' (BMGMCs) have also been developed. BMGMCs are characterized in that they possess the amorphous structure of BMGs, but they also include crystalline phases of material within the matrix of amorphous structure. For example, the crystalline phases can exist in the form of dendrites. The crystalline phase inclusions can impart a host of favorable materials properties on the bulk material. For example, the crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

While metallic glass-based materials are characterized by a host of desirable material properties, it has proved to be challenging to economically fabricate useful objects that include metallic glass-based materials and harness their vast potential. For example, the development of the requisite amorphous structure generally substantially limits the available manufacturing techniques for fabricating such objects. For instance, fabricating useful objects that incorporate metallic glass-based materials currently relies on the casting of metallic glass-based materials from a suitable molten composition; while such casting methodologies are effective in many respects, they are not necessarily conducive to volume manufacturing (e.g. the overall rate of manufacture can be limited by: the relatively slow rate of the casting process; the number of the number of available molds; and the oversight required for the process). In effect, the heavy reliance on these casting techniques—which tend not to be conducive to volume manufacturing—hinders the business case for the manufacture of useful objects that include metallic glass-based materials. Additionally, while the referenced casting methodologies can be relatively effective, in some instances (as with all injection molding processes) they can be susceptible to relatively low yield.

Against this backdrop, if feedstock metallic glass-based materials—e.g. in the form of sheets, wires, or fibers—can practicably be made to be widely available, the efficiency and economic viability of manufacturing objects including metallic-glass based materials can substantially improve. For instance, existing metalworking technologies (e.g. progressive stamping and screw machines) can be more readily adapted for working on such feedstock materials. Accordingly, systems and methods in accordance with embodiments of the invention are directed towards effectively and efficiently drawing high aspect ratio metallic glass-based material—e.g. in the form of sheets, fibers, ribbons, or wires, which can serve as feedstock.

Thus, many embodiments of the invention are premised on methods and apparatuses capable of imposing precise conditions that can allow a high aspect ratio metallic-glass based material to be drawn from a metallic glass-based composition in a steady state manner. In this way, a high aspect ratio metallic glass-based material can be drawn for an arbitrary length, e.g. thereby creating metallic glass-based feedstock material. For example, some embodiments are directed to the fabrication of a metallic glass-based fiber of an arbitrary length that can be drawn and wound on a spool. In numerous embodiments, a method of drawing a high aspect ratio metallic glass-based material is premised on stably drawing high aspect ratio metallic glass-based material from a preform metallic glass-based composition, accounting for the relationships between: the desired formation of an amorphous structure that is substantially homogenous along the majority of the length of the drawn high aspect ratio material; the desired final geometry of the drawn high aspect ratio material; the nature of the force that is used to draw the molten metallic glass-based composition; the velocity at which the high aspect ratio material is drawn; the viscosity profile of the material along its length as it is being drawn; and/or the effect of temperature on the metallic glass-based material. In many embodiments, a precise thermal treatment is imposed along the forming length of the drawn material so as to enable a steady state drawing process, the precise thermal treatment being based on: the desire to develop a substantially same amorphous structure along the length of the drawn material; the desired final geometry for the drawn material; the nature of the force used to draw the material; the velocity at which the material is being drawn; and/or the thermal treatment's impact on the viscosity profile of the material along its length as it is being drawn. The instant application discloses methods and apparatuses that impose various forming parameters (e.g., temperature, geometry, velocity, viscosity and/or force) that are involved in the steady state drawing of high aspect ratio metallic glass-based materials, their relationships with one another, and how they may be controlled to facilitate an effective and efficient drawing process. Methods and apparatuses in accordance with such embodiments are now discussed in greater detail below.

Methodologies for Drawing High Aspect Ratio Metallic Glass-Based Materials

While existing drawing techniques may be suitable for many conventional materials (e.g. glass, metal, and plastic), the drawing of metallic glass-based materials presents unique challenges. For example, metallic glass-based materials largely do not have the malleability to be extruded in the absence of at least some thermal softening. Rather, they generally need to be softened—e.g. via appropriate thermal treatments—in order to be made to be malleable enough to be reshaped. However, exposing metallic glass-based materials to such thermal treatments carries with it the risk of compromising the amorphous structure that gives rise to many of the advantageous materials properties that make metallic glass-based materials such appealing engineering materials. Further along these lines, metallic glass-based materials can be highly sensitive to thermal treatments. For example, even subtle differences in thermal treatments can give rise to different physical structures. Moreover, even mildly elevated temperatures—over an extended period of time—can begin to compromise the desired amorphous structure. Against this backdrop, many embodiments of the invention implement methods and apparatuses that are effective to draw high aspect ratio metallic glass-based materials accounting for the sensitive nature of these materials. Furthermore, many embodiments of the invention are directed towards drawing processes that are effective to draw high aspect ratio metallic glass-based materials such that the amorphous structure of the drawn material is substantially homogenous along the majority of the length of the drawn material. Additionally, many embodiments are drawn to processes that are suitable to draw metallic glass-based materials in a steady state manner; in this way high aspect ratio metallic glass-based materials can be drawn for an arbitrary length. Thus, many embodiments of the invention can thereby enable the effective and efficient fabrication of high aspect ratio metallic glass-based materials that can viably serve as feedstock material.

FIGS. 1A-1I illustrate a fundamental drawing configuration, including pertinent operation data, for drawing a high aspect ratio metallic glass-based material, in the form of fiber, in a steady state manner such that the structure of the drawn fiber is substantially homogenous along the majority of the length of the fiber in accordance with many embodiments of the invention. Importantly, many of the principles underlying the methods for drawing disclosed in the instant application can be understood from the discussion below with respect to FIGS. 1A-1I.

FIG. 1A depicts the steady-state drawing of a metallic glass-based material 102 using a drawing apparatus 101 in accordance with an embodiment of the invention. FIG. 1A also depicts construction lines defining three distinct thermal processing zones: a pre-heat zone 104, a main heat zone 106, and a post-heat zone 108. Region 110 indicates that the metallic glass-based material can remain sufficiently malleable for drawing purposes until some point within the region. In other words, there is variability in the length/duration of the post heat zone 108. The portion of the metallic glass-based material 102 in the pre-heat zone 104, and upstream of the pre-heat zone 104, can be referred to as 'the preform,' and the portion of the metallic glass-based material 102 that is beyond the post-heat zone 108 can be referred to as 'the drawn fiber.' In the main heat zone 106 and the post-heat zone 108, the metallic glass-based material 102 is made to be sufficiently malleable such that it can be drawn. Within the context of the instant application, a metallic glass-based material 102 provided for a respective drawing operation can also be referred to as a workpiece. The thermal processing of the metallic glass-based material 102 illustrated in FIG. 1A will be discussed in greater detail with respect to FIG. 1B. It is illustrated that the metallic glass-based material 102 is fed into a drawing apparatus 101 at a velocity $v_1$, whereas metallic glass-based material 102 is drawn as a fiber at a velocity $v_2$. Importantly, note that FIG. 1A is meant to depict the continual feeding and drawing of the metallic glass-based material 102. In other words, the profile view illustrated in FIG. 1A will remain largely the same as the fiber is being drawn from the preform.

As in conventional drawing processes, as the material 102 is drawn, it undergoes a reduction in cross-sectional area from a cross-sectional area $A_1$ to a cross-sectional area $A_2$. As can be appreciated from the context as well as the continuity equation, $A_1v_1=A_2v_2$. In other words, as the cross-sectional area of the material reduces (because of the drawing of the fiber), the velocity of the material through the apparatus 101 must increase in order to preserve a steady state drawing scenario.

With this as the underlying scheme, many embodiments of the invention impose processing parameters that enable the steady state drawing of the material such that the majority of the drawn material has a substantially homogenous structure. In particular, embodiments of the 'processing parameters' can be understood in relation to the underlying governing physics. More specifically, the relationship between the applied stress and the viscosity of a malleable metallic glass-based composition (i.e. the composition as it is being drawn) can be given by:

$$\sigma = 3\dot{\epsilon}v \quad (EQ. 1)$$

This relationship can be re-written as:

$$F = 3v\dot{\epsilon}A \quad (EQ. 2)$$

Note that this relationship holds for every infinitesimal "cross-sectional slice" along the length of the malleable material as it is being drawn.

In many instances the fiber is drawn by applying tension (e.g. via 'pulling') to the preform; in many instances, the force applied can be fairly presumed to be constant along the length of the material. Additionally, given that what is desired is a steady state drawing operation, it follows that the strain rate will be constant over time for each infinitesimal cross-sectional slice along the length of the workpiece as it is being drawn during the desired steady state operation. Finally, it is known that the drawing operation will result in a reduction of cross-sectional area through the length of the material as it is being drawn. Thus, given that the force and the strain rate are generally constant within the instant context of a steady state drawing operation, and given that the cross-sectional area reduces along the length of the material as it is being drawn, in many embodiments the viscosity is varied (e.g., correspondingly increased) across the length of the malleable composition in order to preserve the desired steady state drawing operation. In other words, in the absence of a counteracting viscosity gradient, the drawn material may be subject to undesired necking or else tensile fracture; thus, a counteracting viscosity gradient can be imposed to prevent this result.

Stated differently, a sample of a metallic glass-based material at a uniform temperature has a uniform velocity throughout. If a pulling force is applied to one end which is greater than $F_{yield}$, the material will begin to neck. As the cross-sectional area decreases during necking, the strain rate must increase to balance the equation, $F=3v\dot{\epsilon}A$. If the necking continues with no increase in viscosity, the sample will neck to failure. If viscosity increases with respect to decreasing area, the sample can be drawn into a much higher aspect ratio. With a sample at a uniform temperature (or insignificant temperature gradient), the only way that this can occur is if the strain rate increases enough to where the flow becomes non-Newtonian and strain hardening begins. "Effects of Test Temperature and Loading Conditions on the Tensile Properties of a Zr-based bulk metallic glass" published in *Metallurgical and Materials Transactions*, Volume 39A, August 2008 to Vormelker et al., and "Micro- and Nanoscale Metallic Glassy Fibers" published in *Advanced Engineering Materials,* 2010, 12, No. 11 to Yi et al., describe previous drawing methodologies; these cited disclosures are hereby incorporated by reference in their entirety. These previously described methods have relied on this strain hardening to allow drawing. For example, Vormelker et al. showed success by use of constant force over constant displacement. Due to uniform viscosity, constant force enables the stain rate to accelerate with the reducing area due to the disparity between the force needed to deform the BMG at a given point and the force applied; the greater this difference, the higher the stain rate. If the entirety of the sample remains in the heating apparatus during tensioning the only stabilizing factor possible is stain hardening brought on by the transition to non-Newtonian flow.

Even though the thinning sample exits in the heating apparatus discussed in the publication to Yi et al., the main stabilizing factor proves to be strain rate due to the fact that thinner fibers are created by decreasing driving force (constant force was also applied in these experiments). The reverse would be expected if the viscosity were exclusively temperature dependent. For the material to deform, the $F_{yield}$ must be lower than the $F_{applied}$; when $F_{yield} > F_{applied}$ deformation stops. The temperature gradient which drives the viscosity gradients diminishes with distance from the heat source. The increasing, thermal driven, viscosity does not let the stain rate accelerate to the point of non-Newtonian flow. With a higher applied Force and assuming Newtonian flow where, $F=3v\dot{\epsilon}A$, the $F_{yield}$ would not surpass the $F_{applied}$ until a farther distance from the heat source. With a higher $F_{applied}$, the yield viscosity would rise (and occur at a lower temperature which is farther from the source) and the strain rate would rise. With a higher stain rate to a farther point, the final area must be smaller. Simply, a higher force can pull farther and for more time. But if the viscosity gradient is insufficient to control strain rate, the flow will transition to non-Newtonian. At this point the viscosity will rise exponentially due to strain hardening, stabilizing the draw. At the instant minutely prior to this transition, for any force applied, both the viscosity and strain rate are fixed regardless of the force applied. The viscosity is temperature dependent and due to the insignificant gradient, can be assumed to be close to viscosity of the source material. The stain rate is the maximum allowed for Newtonian flow. Considering $F=3v\dot{\epsilon}A$ at the point of $F_{yield}$ equals $F_{applied}$, a lower force with viscosity and strain rate fixed, will result in a smaller final area.

Both of these papers demonstrating successful drawing have depended on a constant force being applied to the preform. This is in contrast to constant displacement, which failed to produce wire. These results are inconsistent with those described in the instant application, which have shown constant displacement to produce long lengths of uniform wire. This is because many of the methods described herein can implement a startup set of parameters, which is neither force or displacement constant. The velocity steadily increases from $v_1$ to $v_{final}$. The force also increases from 0 to $F_{applied}$. When $v_{final}$ is reached, it is fixed and $F_{applied}$ adapts to $F_{yield}$—any drop in $F_{yield}$ results in a drop in $F_{applied}$. The constant displacement method can allow for a more predicable product as it is less affected by subtle changes along a preform. At a fixed final velocity, the final diameter is determined by the final velocity in relation to the initial area and velocity ($A_1v_1=A_2v_2$).

With this in mind, many embodiments of the invention impose a 'viscosity gradient' using precise thermal treatments along the length of the workpiece as it is being drawn. In general, the viscosity of a metallic glass-based material is logarithmically related to its temperature. For example, above the glass transition temperature, an increase in temperature generally causes a corresponding reduction in viscosity. Accordingly, in some embodiments this correlation is utilized to impose a precise temperature gradient to provoke the desired viscosity gradient within the preform and drawn fiber such that the referenced steady state drawing processes may be enabled.

Figure 1B:
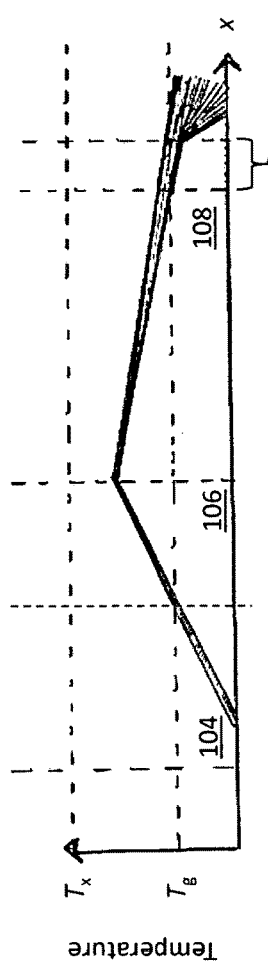

Importantly, note that the precise temperature profile must be imposed in view of the thermally sensitive nature of the amorphous structure of metallic glass. In particular, as alluded to above, prolonged exposure of a metallic glass-based material to elevated temperatures (e.g. temperatures above the inherent glass-transition temperature) can have a deleterious effect on the amorphous structure, and the higher the temperature, the greater the risk of compromising the amorphous structure. Accordingly, in many embodiments of the invention, precise temperature profiles are imposed on the workpiece that are effective to result in a steady state drawing operation (by giving rise the requisite viscosity gradient), but at the same time are imposed so as to reduce the length of time that metallic glass-based composition is exposed to deleterious elevated temperatures. Hence, FIG. 1B illustrates embodiments of temperature profiles that may be implemented in relation to FIG. 1A to provoke the desired viscosity gradient, which can result in the sought after steady state operation; note that $T_g$ indicates the glass transition temperature while $T_x$ indicates the crystallization temperature. In particular, it is illustrated that in the pre-heat zone 104, the working temperature of the metallic glass-based material 102 is raised to the glass transition temperature. As can be appreciated, the glass transition temperature is the temperature at which the composition substantially changes from a hard, glassy state to one that is discretely more malleable. Subsequently, in the main-heat zone 106, the working temperature of the metallic glass-based composition is raised to a temperature above the glass transition temperature. The metallic glass-based composition is thereby made discretely more malleable, such that a viscosity gradient can be formed across the material, thereby allowing drawing operations to proceed. More specifically, in some embodiments the material is raised to a working temperature such that the working portion of the material will remain above the glass-transition temperature long enough for the drawing operation to proceed such that the fiber can be drawn to the desired cross-sectional profile.

In many embodiments, within the post-heat zone 108, the temperature is gradually brought back down to the glass-transition temperature. Referring back to FIG. 1A, it can be seen that the gradual reduction of the temperature to the glass-transition temperature corresponds with the reduction of the cross-sectional area to the desired profile. In various embodiments, beyond the post-heat zone 108, the temperature of the drawn fiber is allowed to more abruptly reduce since at this point, the desired structure is largely, if not entirely, established. Recall again that in the main heat zone 106, the temperature of the metallic glass-based composition 102 is raised to only that amount above the glass transition temperature that will enable the composition to be sufficiently viscous that it can be drawn so that the final desired cross-section can be achieved. As alluded to previously, region 110 indicates that there can be flexibility as to how long the metallic glass-based material is held above the glass-transition temperature during the post-heat zone.

Figure 1C:
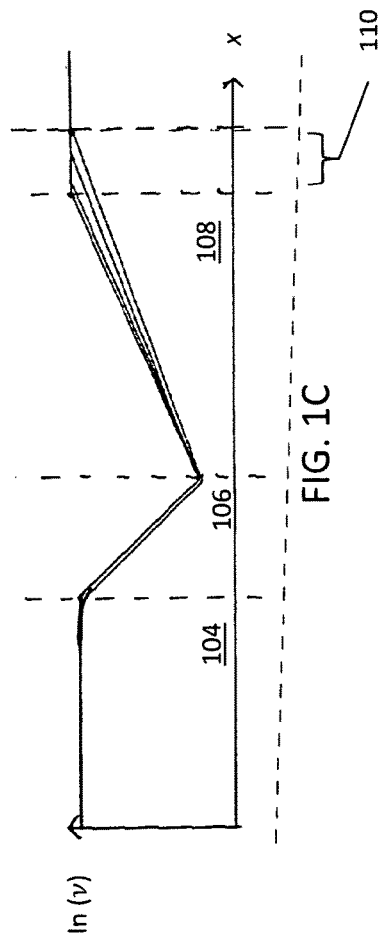

FIG. 1C illustrates the corresponding plot of the natural logarithm of the viscosity of the workpiece. In effect, it is depicted that, in the pre-heat zone 104, the preform is effectively infinitely viscous as it is a solid. Thereafter, when the temperature of the workpiece is raised to above the glass transition temperature in the main heat zone 106, the viscosity of the composition abruptly drops. In the post-heat zone 108, as the temperature is controllably gradually made to cool, the viscosity gradually (and controllably) increases until the composition solidifies, where it reaches the same viscosity as the preform. As mentioned above, it is the establishment of this controllable viscosity gradient, in accordance with many embodiments of the invention, that enables the steady state drawing of the metallic glass-based fiber material. Also as mentioned previously, region 110 indicates that there can be flexibility as to when/where the metallic glass-based material eventually solidifies.

Figure 1D:
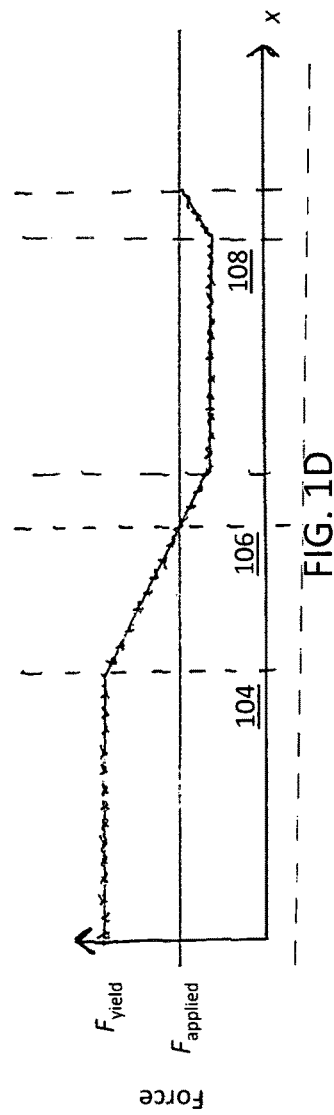
Figure 1E:
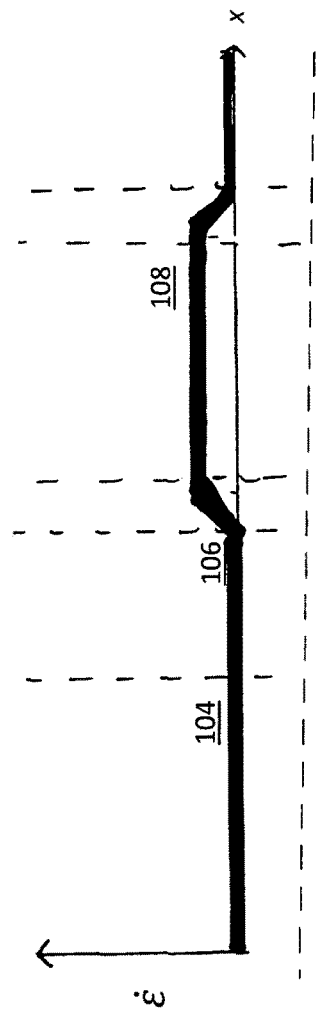
Figure 1F:
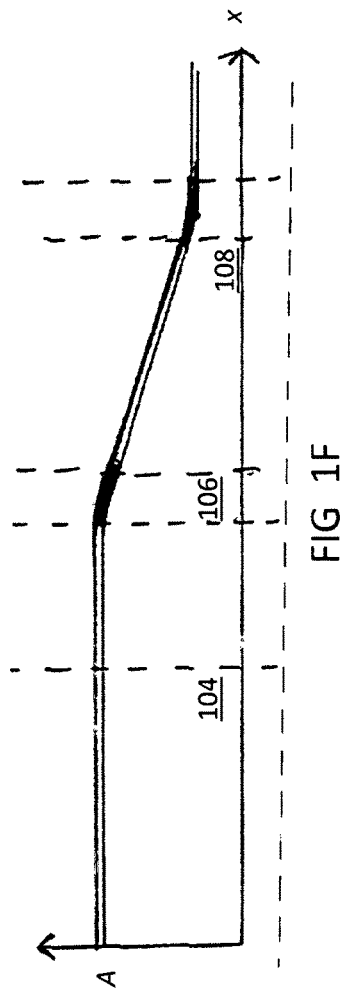

FIGS. 1D-1F illustrate how various parameters of the workpiece vary as it is subjected to the drawing process when the yield force is held substantially constant during the post-heat zone 108. In particular, FIG. 1D depicts a corresponding plot showing the variation of the applied force ($F_{applied}$) and the yield force ($F_{yield}$, i.e. the force required to yield the material) across the length of the workpiece. In particular, it is depicted that the applied force can be understood to be relatively constant across the length of the workpiece as it is being drawn. By the same token, the yield force is depicted as varying as the workpiece is subject to the various thermal zones. More specifically, it is depicted that the yield force reduces below the applied force in the main heat zone, where the material begins to yield (e.g. based on the applied force). As can be appreciated, in many embodiments the yield force is gradually reduced (e.g. via the application of the thermal treatment) until it is reduced below the applied force in the post-heat zone, where the material is drawn. In other words, the viscosity of the work-piece is configured such that the drawing of the work-piece corresponds with its yielding. As can be appreciated, the yield force of the drawn fiber is less than that of the preform, and this can be understood to follow from the cross-sectional area reduction.

FIG. 1E illustrates a corresponding plot depicting how the rate of strain (E) varies as the metallic glass-based material 102 is subjected to the drawing process the above-discussed drawing process. In particular, it is illustrated that the rate of strain (E) is elevated to a certain value in the main heat zone 106. It is depicted that this rate of strain is held constant for the majority of the post-heat zone 108, and this constant rate of strain coincides with the constant difference between the applied force and the yield force depicted in FIG. 1D.

FIG. 1F illustrates a corresponding plot depicting how the cross-sectional area is reduced during the above-discussed drawing process in accordance with an embodiment of the invention. In particular, it is illustrated that the cross-sectional area reduces in a linear fashion when exposed to the above-illustrated processing methodologies.

While FIGS. 1D-1F illustrate operation data relevant to a processing methodology based on the cross-sectional area reducing in a linear fashion, it should be understood that the described processing methodologies can be applied to any of a variety scenarios of cross-sectional area reduction in accordance with many embodiments of the invention. For example, in many embodiments, the yield force can vary in any of a variety of ways while the material is being drawn. Thus for instance, FIGS. 1G-1I illustrate a circumstance where the yield force is reduced (e.g. via thermal processing) until it reaches a minimum value, and then is gradually made to increase for the duration of the post heat zone 108. In particular, FIG. 1G illustrates that, during the post-heat zone, the yield force is made to linearly reduce until it reaches a minimum value, and thereafter linearly increase. As can be appreciated, this can be done via an appropriate thermal treatment. FIG. 1H illustrates how the strain rate correspondingly increases while the yield force is decreasing, and then decreases while the yield force is increasing. FIG. 1I correspondingly illustrates how the cross-sectional area varies within this methodology. In particular, it is depicted that the cross-sectional area gradually increases its rate of reduction until it reaches an inflection point—which corresponds with the point at which the yield force begins to trend upward in the post-heat zone. Beyond the inflection point, the rate of reduction of the cross-sectional area reduces. It should be noted that, in general, the cross-sectional area of the material as it is being drawn can be reduced in any of a variety of suitable ways—and correspondingly, the underlying relationship can be maintained to preserve the desired steady state drawing scenario in any of a variety of suitable ways—in accordance with embodiments of the invention.

Importantly, it should also be noted that because the above-stated methodologies result in steady state drawing, each region of the majority of the drawn material will have undergone the same thermal treatment (e.g., have the same heating and cooling or temperature history). For example, each such region will have gone through the pre-heat zone, the main heat zone, and the post-heat zone for the same duration of time, and be exposed to the same extent of thermal processing. Consequently, the amorphous structure of the majority of the drawn material, in accordance with embodiments, can be expected to be substantially uniform. In this way, the above described operating principles can be implemented to manufacture substantially uniform, high aspect ratio metallic glass-based materials that can viably serve as feedstock for further processing.

In general, as can be appreciated, the processing parameters underlying the steady state drawing of metallic glass-based materials, in accordance with embodiments, can be garnered from the discussion above with respect to FIGS. 1A-1I. As can additionally be appreciated, these principles can be applied to draw metallic glass-based materials in any of a variety of ways. Various methods for drawing metallic glass-based materials in a steady state manner in accordance with the discussed relationships are now discussed below.

Processes for Drawing High Aspect Ratio Metallic Glass-Based Materials

Figure 2:
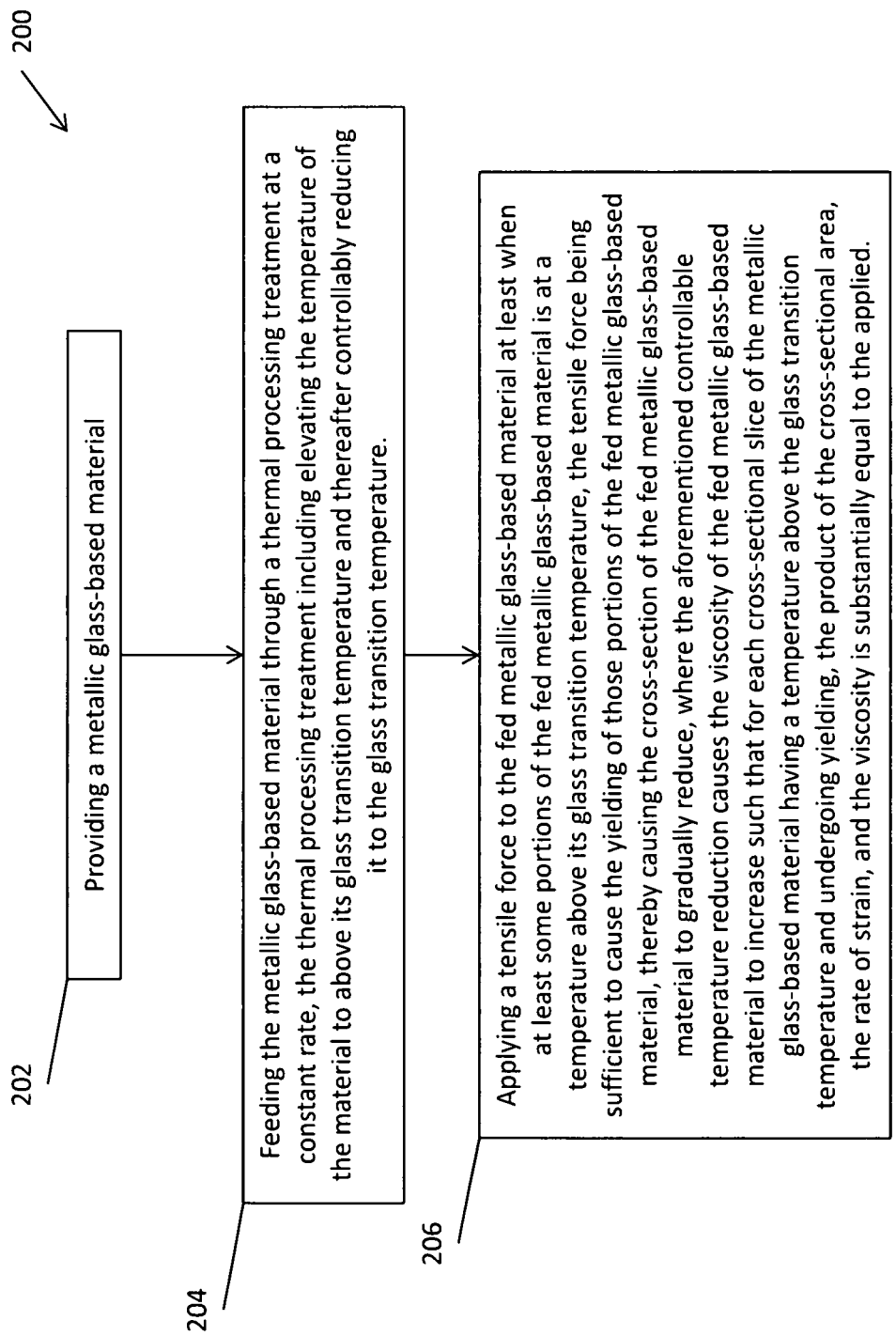
FIG. 2 illustrates a method for drawing a high aspect ratio metallic glass-based material in accordance with many embodiments of the invention.

As can be appreciated, the above-described principles can be implemented in any of a variety of ways to draw high aspect ratio metallic glass-based materials in a steady state manner. For example, in many embodiments, a precise thermal processing regimen is imposed on a metallic glass-based material as it is being drawn such that a viscosity gradient is imposed that enables the steady state drawing of the metallic glass-based material. Thus, for instance, FIG. 2 illustrates a method of fabricating a high aspect ratio metallic glass-based material by imposing a precise thermal processing treatment while drawing the metallic glass-based material. In particular, it is illustrated that the method 200 includes: providing 202 a metallic glass-based material; feeding 204 the material through a thermal processing treatment; and applying 206 a tensile force to the fed metallic glass-based material sufficient to cause it to yield while it is undergoing thermal processing so as to allow for steady state drawing processes.

Note that the illustrated method 200 is not intended to be limited to any particular metallic glass-based material. Rather, any suitable metallic glass-based material can be provided 202 in accordance with many embodiments of the invention. For example, in many embodiments, the provided metallic glass-based materials can be characterized as bulk metallic glass compositions (having critical casting thicknesses no greater than 1 mm, i.e., they can be cast using conventional techniques at thicknesses greater than 1 mm). In a number of embodiments, metallic glass matrix composites are implemented that include an aggregate of crystalline structure and amorphous structure. In general, the disclosed methods can be suitably implemented using any of a variety of metallic glass-based materials.

Figure 3B:
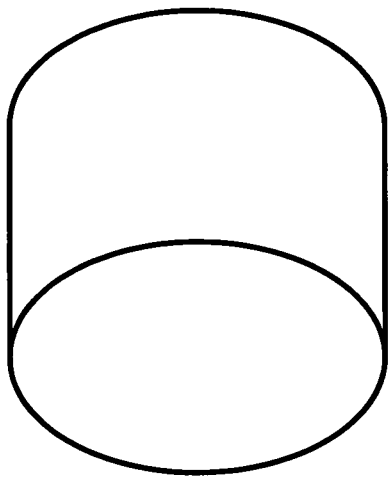
FIGS. 3A-3D illustrate various forms that a metallic glass-based material provided for drawing operations can take in accordance with certain embodiments of the invention.
Figure 3D:
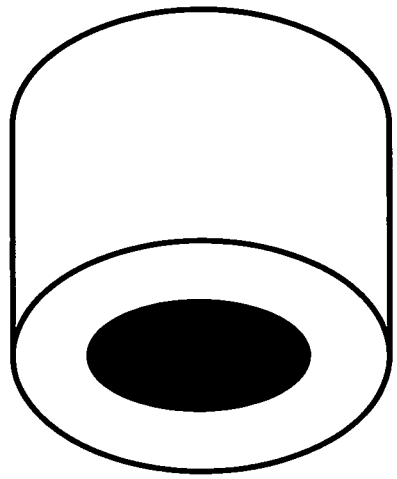
Figure 3A:
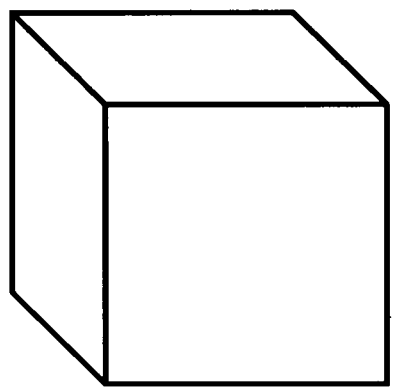
Figure 3C:
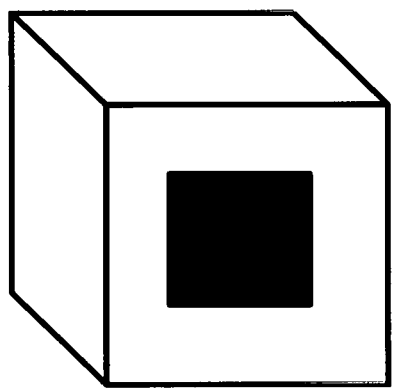

Moreover, the provided metallic glass-based material can be provided in any of a variety of form factors. For example, FIGS. 3A-3D illustrate various form factors that the provided metallic glass-based materials can take. In particular, FIG. 3A illustrates that metallic glass-based material can be provided in a prism-like form factor, having a rectangular (or square-shaped) cross-section. FIG. 3B illustrates that the metallic glass-based material can be provided in a cylindrical form factor, e.g. having a circular cross-section. FIG. 3C illustrates that the metallic glass-based material can be provided in a form factor characterized by a hollowed out rectangular prism. Similarly, FIG. 3D illustrates that the metallic glass-based material can be provided in a form factor characterized by a hollowed out cylinder. Where the metallic glass-based material is provided in a hollowed out format, the drawing of it can correspondingly result in a final tube-shaped geometry. In general, as can be appreciated, the metallic glass-based material can be provided in any of a variety of form factors suitable to enable the steady-state drawing of the metallic glass-based material.

Referring back to FIG. 2, the illustrated method 200 further includes feeding 204 the metallic glass-based material through a thermal processing treatment at a constant rate, the thermal processing treatment including elevating the temperature of the metallic glass-based material to above its glass transition temperature. As can be appreciated, the feeding can occur in any of a variety of ways in accordance with many embodiments of the invention. For example, in many embodiments the metallic glass-based material is fed through the thermal processing treatment using a pulling force in conjunction with at least one guide roller. Thus for example, FIG. 4 illustrates how guide rollers can be used to facilitate the feeding of the metallic glass-based material through the thermal processing treatment. In particular, it is depicted that the metallic glass-based material 402 is disposed adjacently to and in intimate contact with guide rollers 404. A pulling force is used to draw the material, and the guide rollers 404 are used to provide a suitable amount of constraint and therefore facilitate the drawing of the material. In this way the feeding rate (e.g. $v_1$) and the drawing rate (e.g. $v_2$) can be controlled.

Of course, it can be appreciated that ancillary rolling mechanisms can further be used to facilitate the feeding of the metallic glass-based material through the thermal processing treatment. Thus, for example, FIG. 5 depicts the use of movement rollers to further facilitate the feeding of the metallic glass-based material through the thermal processing treatment. In particular, it is depicted that movement rollers 506 are used to facilitate the feeding of the metallic glass-based material 502 through the thermal processing treatment; as before, guide rollers 504 can be used to constrain the motion and otherwise facilitate the drawing of material. The movement rollers can help encourage the material 502 through the thermal processing regimen.

Figure 6:
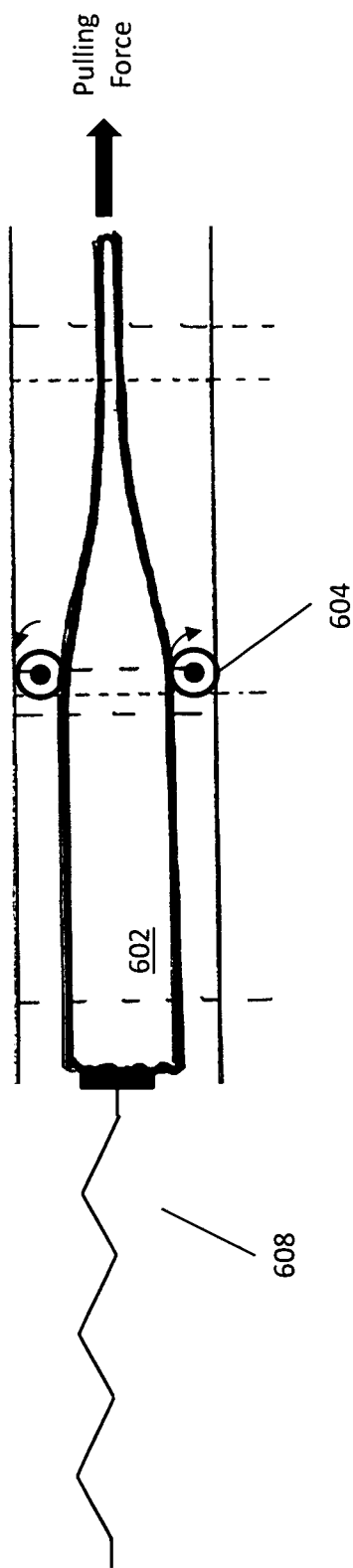
FIG. 6 illustrates the implementation of a spring to facilitate the feeding of provided metallic glass-based material through a thermal processing regimen in accordance with certain embodiments of the invention.

Although rolling members are illustrated, it should be clear that any of a variety of feeding mechanisms could be implemented to facilitate the feeding of a metallic glass-based material into a thermal processing treatment in accordance with embodiments of the invention. For example, in a number of embodiments, a spring system is used to facilitate the feeding of the metallic glass-based material through the thermal processing treatment. Thus, for example, FIG. 6 illustrates the use of a spring to facilitate the feeding of the metallic glass-based material through the thermal processing treatment. In particular, it is depicted that a spring 608 is being used in conjunction with guide rollers 604 to constrain the metallic glass-based material 602 as it is pulled through the thermal processing treatment. Thus, for example, the appropriate velocities (e.g. $v_1$ and $v_2$) can be maintained. Of course, while a spring is depicted, it can be appreciated that any suitable mechanism can similarly be used to facilitate the proper feeding of the metallic glass-based material through the thermal treatment system. For example, in some embodiments, a piston system is used, and in a number of embodiments, a threaded arm is used. More generally, any of a number of suitable mechanisms could be used to facilitate the feeding of the metallic glass-based material through the thermal processing treatment in accordance with many embodiments of the invention. In general, the illustrated and discussed feeding techniques are meant to be illustrative of the ways in which the feeding can be implemented; to be clear, embodiments of the invention are not limited to only these illustrated and discussed feeding techniques.

Importantly, any suitable thermal processing treatment that can enable the steady state drawing of high aspect ratio metallic glass-based materials can be implemented in accordance with many embodiments of the region. In many embodiments, a thermal processing treatment is imposed that raises the temperature of the metallic glass-based material to above its respective glass transition temperature only at the point that the material is to be drawn such that the viscosity of the metallic glass-based material is reduced sufficiently to allow drawing of the material, and thereafter controllably reduces its temperature while it is being drawn such that for every cross-sectional slice of the material as it is being drawn, the product of 3 times the viscosity, the rate of strain, and the cross-sectional area is substantially equal to the applied drawing force (recalling that the viscosity of the material as it is being drawn can generally be correlated with the temperature of the material). As discussed above, this relationship can enable the steady state drawing of the metallic glass-based material.

Note that the viscosity of the yielding material tends to be logarithmically related to its temperature. Accordingly, in many embodiments, the applied force is known, the profile of the material as it is drawn—e.g. including the cross-sectional area of each cross-sectional slice of drawn material—is known, and the rate of strain for each cross-sectional slice is known; hence, the desired viscosity gradient can be computed, and correspondingly the desired precise temperature profile can also be computed. With this information, a thermal processing treatment can be imposed that can enable the steady state drawing of the metallic glass-based material. More specifically, from Equation 2, we can conclude for each cross-sectional slice of the material as it is being drawn:

$$v = \frac{F}{3\dot{\epsilon}A} \quad \text{(EQ. 3)}$$

Thus, since for each cross-sectional slice of the metallic glass-based material as it is being drawn is, the applied force, the strain rate, and the cross-sectional area can be known, and the viscosity enabling steady state drawing can therefore be computed (i.e. for each cross-sectional slice). And, as alluded to above, since the temperature and viscosity can be correlated, the appropriate temperature profile can be computed.

It should be clear that the stated thermal processing treatment can be implemented in any of a variety of ways. For example, as can be garnered from the discussion in the preceding section, the thermal processing treatment can include subjecting the fed metallic glass-based material to three consecutive thermal processing regions: a first thermal processing region, that can be referred to as a 'pre-heat zone,' that raises the temperature of the metallic glass-based material to its glass transition temperature; a second thermal processing region, that can be referred to as the 'main heat zone,' that raises the temperature of the metallic glass-based material to some amount above the glass transition temperature; and a third thermal processing region, that can be referred to as the 'post-heat zone,' that controllably reduces the temperature of the fed metallic glass-based material until it reaches the glass transition temperature. Within the context of the instant application, metallic glass-based material that has not yet experienced thermal processing sufficient to yield it can be referred to as 'preform'; the metallic glass-based material that is yielding and being exposed to a drawing force can be referred to as 'metallic glass-based material as it is being drawn'; and metallic glass-based material that has completed its exposure to the thermal processing treatment can be referred to as 'finally drawn metallic glass-based material.' As can be appreciated from the discussion above, the controlled temperature reduction allows the viscosity of the metallic glass-based material to be controlled so that the desired outcome—i.e. the steady state drawing of the metallic glass-based material—can be realized. In other words, the controlled temperature reduction is implemented such that as the material is being drawn, the product of 3, the viscosity the strain rate and the cross-sectional area is substantially equal to the applied force for each cross-sectional slice of the material being drawn.

Additionally, in many embodiments, the temperature of the metallic glass-based material is elevated above the glass transition temperature only to the extent necessary to allow the drawing of the metallic glass-based material such that the desired cross-sectional profile can be achieved. For example, where it is desired that the cross-sectional area of the drawn metallic glass-based material be relatively smaller, the metallic glass-based material can be heated above its glass transition temperature to a relatively greater extent. In this way, the fed metallic glass-based material will remain sufficiently viscous for a greater amount of time, and thereby can be drawn for a greater amount of time, which can result in the finally drawn material having a reduced cross-sectional area. By contrast, where it is desired that the cross-sectional area of the drawn metallic glass-based material have a relatively larger cross-sectional area, the fed metallic glass-based material can be heated to above its glass transition temperature to a relatively lesser extent; as can be appreciated, the fed metallic glass-based material would thereby remain viscous for only a shorter period of time, and consequently the drawing process would result in the finally drawn material having a relatively larger cross-sectional area.

Figure 7:
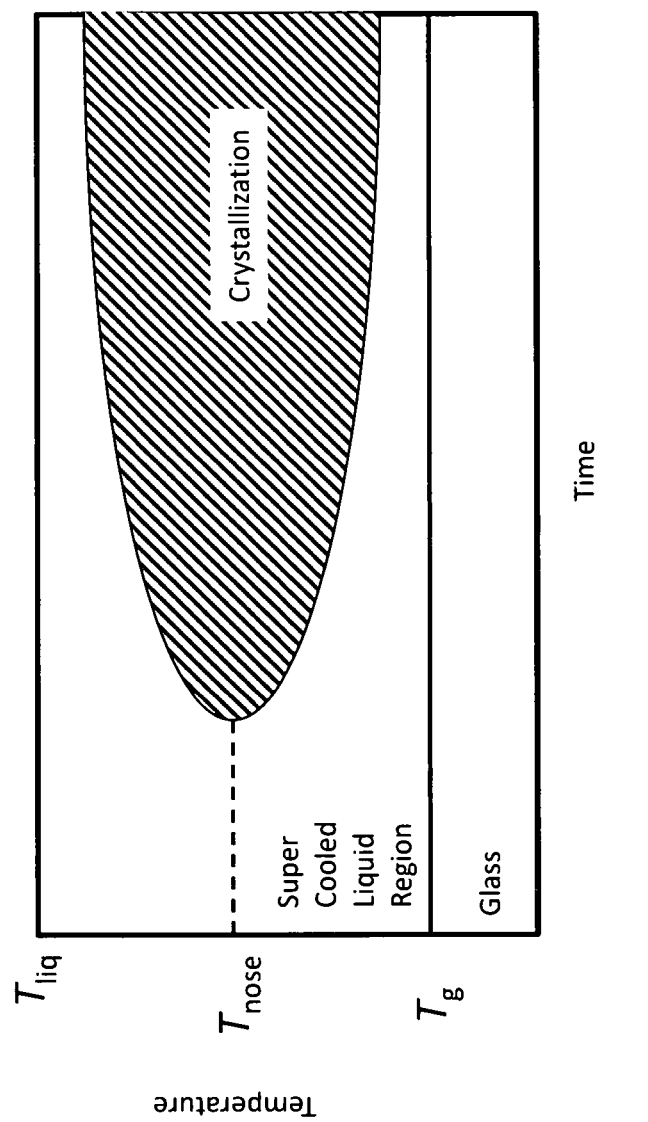
FIG. 7 illustrates a time-temperature-transformation graph for a provided metallic glass-based material that can help govern the application of a thermal processing treatment in accordance with certain embodiments of the invention.

In numerous embodiments, the time under which the metallic glass-based material is held at a temperature above its glass transition temperature accounts for the desired final amorphous structure. For example, as discussed above, as metallic glass-based materials can be thermally sensitive, prolonged exposure to elevated temperatures (e.g. temperatures above their respective glass transition temperature) can have a deleterious effect on the amorphous structure within the metallic glass-based material. FIG. 7 illustrates a time-temperature-transformation diagram illustrating the concept. In general, the diagram illustrates that varying combinations of prolonged high-temperature exposure can result in undesired crystallization of a metallic glass-based material. In general, as can be appreciated, it is desirable to avoid crystallization by cooling the fed metallic glass-based material sufficiently rapidly that the crystallization region of the diagram is avoided. In general, there is a critical temperature, where the risk of unwanted crystallization is most present. Thus, in many embodiments, the controlled temperature profile is imposed in view of this phenomenon. In general, it is often desirable to minimize such prolonged exposure, and in many embodiments, the time and extent to which the metallic glass-based material is held is limited so as to promote the formation of the desired amorphous structure.

Figure 8A:
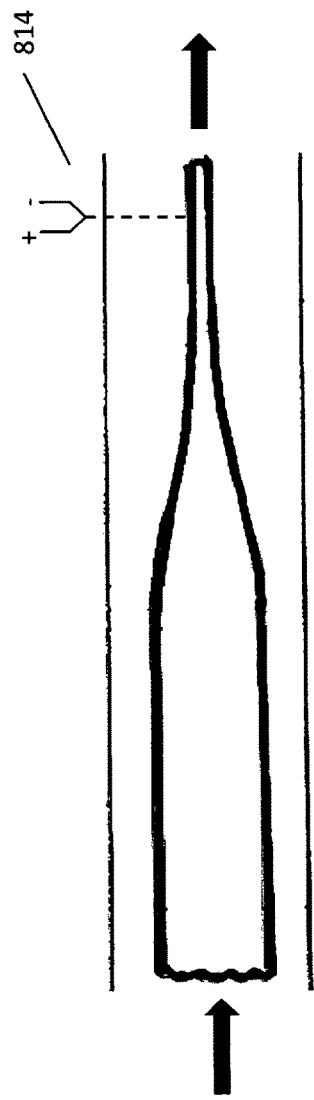
FIGS. 8A-8C illustrate the implementation of heating elements that can be used to apply a thermal processing treatment in accordance with certain embodiments of the invention.
Figure 8B:
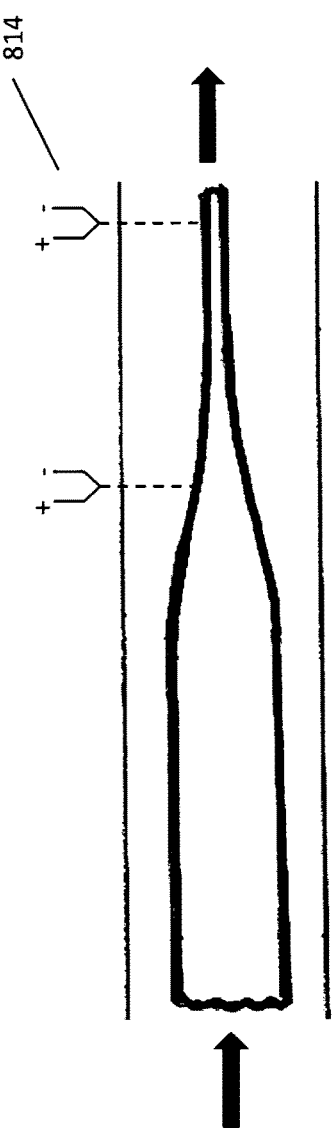
Figure 8C:
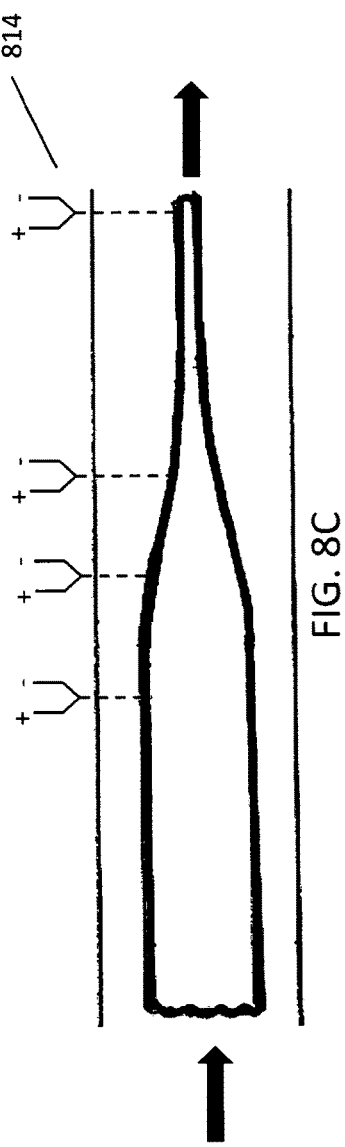

Importantly, the thermal processing treatment can be implemented using any of a variety of temperature control techniques in accordance with many embodiments of the invention. For example, in many embodiments, heating and/or cooling elements are implemented to impose the thermal processing treatment. As can be appreciated, the heating and/or cooling elements can be implemented wherever necessary to exert temperature control over the metallic glass-based material. Of course, any of a variety of heating elements, cooling elements, and temperature monitors (e.g. thermocouples) can be used to impose the thermal processing treatment, and they can be imposed in any of a variety of configurations. Thus, for example, FIGS. 8A-8C schematically illustrate the incorporation of temperature control elements to impose a controlled thermal processing treatment so as to encourage the proper viscosity gradient to enable steady state drawing operations. In particular, FIG. 8A depicts the implementation of a single temperature control element 814 to impose the desired thermal processing treatment; FIG. 8B illustrates the incorporation of two temperature control elements 814 to impose the desired thermal processing treatment, and FIG. 8C schematically depicts the incorporation of four temperature control elements 814 to impose the desired thermal processing treatment. Of course, it should be appreciated, that any of number of heating and/or cooling elements and thermocouples can be implemented, and spaced apart in appropriate ways, to develop the desired thermal gradient (and consequently viscosity gradient), in accordance with many embodiments of the invention. Moreover, in many embodiments the heating/cooling elements can be dynamically reconfigurable (e.g. via an attached controller) so that the temperature profile, and consequently the viscosity profile, can be better controlled even during drawing operations. For example, this can allow for corrective temperature/viscosity adjustments to be implemented.

Figure 9A:
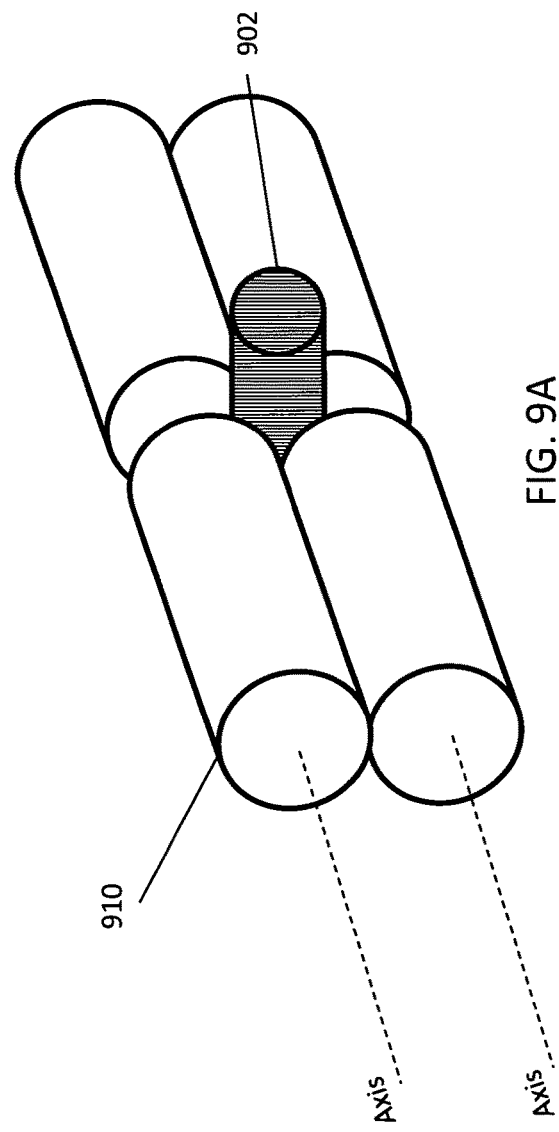
FIGS. 9A-9B illustrate the implementation of grooved roller thermal control elements to impose temperature control on a metallic glass-based material as it is being drawn in accordance with certain embodiments of the invention.
Figure 9B:
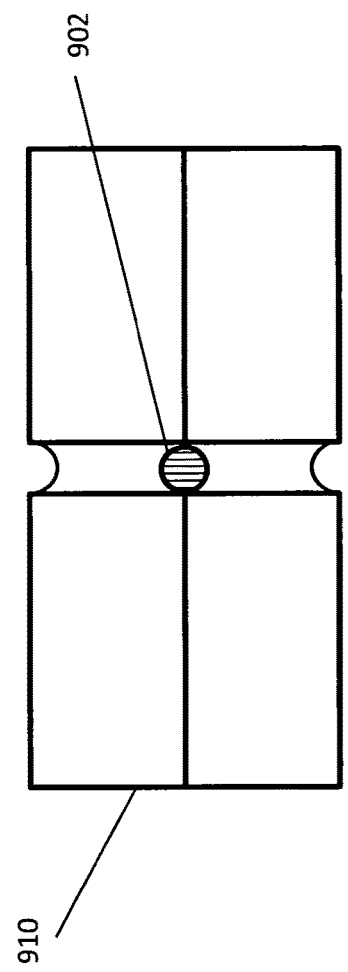

In many embodiments, grooved roller configurations are implemented to impose temperature control on the drawn wire. The roller configurations can be implemented so as to apply temperature control around the perimeter of the drawn material. For example, FIGS. 9A and 9B illustrate a grooved roller configuration that results in the application of thermal control to a drawn material characterized by a circular cross-section. In particular, it is illustrated that the grooved roller configuration includes two grooved rollers 910 that each have a groove that accommodates the drawing of a material 902 characterized by a circular cross-section. The temperature of the grooved rollers 910 can be controlled and thereby transfer heat to the drawn material 902 through conduction. Such a configuration can be advantageous insofar as the drawn material can be heated via conduction through substantially its entire surface area. Stated differently, the rollers can be made to contact the entirety of the surface area of the wire as it is being drawn. In this way, the applied thermal treatment can be made to be more precise. While circular grooves have been illustrated, it should be appreciated that grooves configured to accommodate any suitable cross-section can be implemented in accordance with many embodiments of the invention. For instance grooves that result in the drawing of a material being characterized by a rectangular cross-section can be implemented. More generally, any suitable grooves can be implemented in accordance with any of a variety of embodiments of the invention.

Referring back to FIG. 2, the illustrated method 200 further includes applying 206 a tensile force to the fed metallic glass-based material. The tensile force can be applied at least when some portion of it is above the glass transition temperature. As can be appreciated, the applied 206 tensile force can enable the drawing of the high aspect ratio metallic glass-based material. Notably, the tensile force can be applied in any of a variety of ways. For instance, in many embodiments, a spool can be used to pull the material to thereby draw it. For instance, an edge of the drawn material can be affixed to the spool, and the spool can be rotated to apply the tensile force. More generally, any number of techniques can be implemented to apply the tensile force in accordance with many embodiments of the invention. For example, in some instances, the rollers depicted in FIGS. 9A and 9B can be used to apply a pulling force. In a number of instances, the rollers are only used in this manner where the drawn material is sufficiently hard—otherwise, a material having low viscosity may 'stick' to the rollers.

Figure 10A:
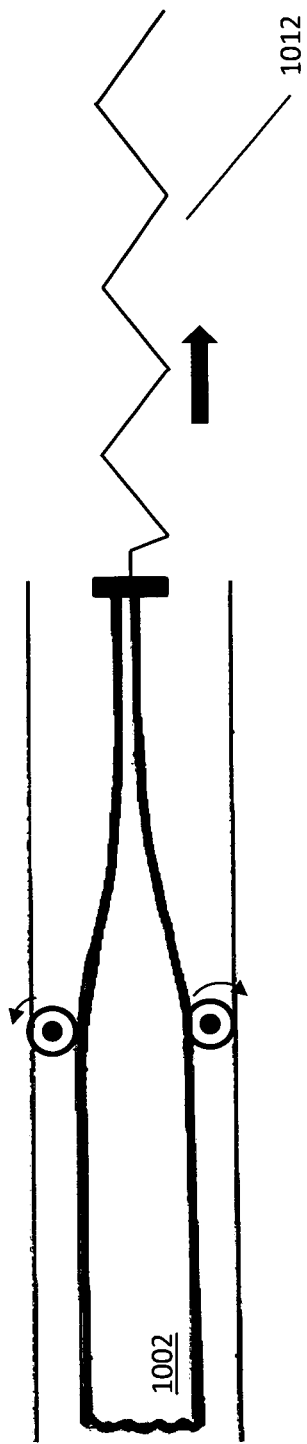
FIGS. 10A-10B illustrate the implementation of a spring to initiate the steady state drawing of a metallic glass-based material in accordance with certain embodiments of the invention.
Figure 10B:
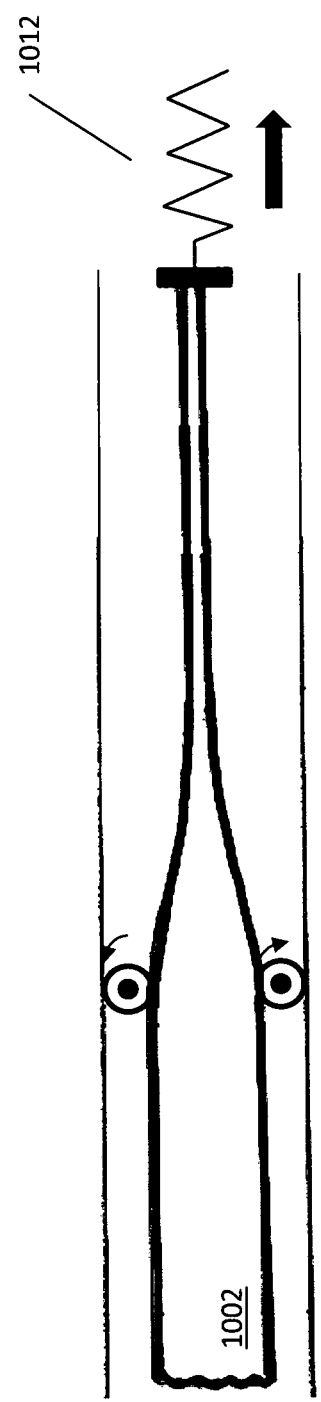

In many embodiments, an ancillary tensile force is implemented to facilitate the initiation of the drawing process. The ancillary tensile force can help the system achieve steady state drawing. For example, in a number of embodiments, a spring can be used to provide the ancillary tensile force. Thus, for example, FIGS. 10A and 10B illustrate using a spring to provide an ancillary tensile force to help initiate the steady state drawing in accordance with many embodiments of the invention. In particular, FIG. 10A illustrates that prior to the initiation of the steady state drawing process, a spring is welded to the tip of the metallic glass-based material 1002. The spring is stretched and can thereby apply an appreciable ancillary tensile force to facilitate the initiation of the steady state drawing operation. FIG. 10B illustrates that as the material 1002 is drawn, the spring 1012 compresses, and thereby reduces in the amount of ancillary force that is provided. At this point, the primary pulling force (e.g. using a spool) can be used to implement the steady state drawing of the wire.

More in particular regarding the mechanics underlying the unique initiation of the drawing process, due to the possibility of a limited preform size and a thermally induced drive towards crystallization, a process start-up may be needed that differs from that used for drawing glasses and plastics. Typically, with quartz, after the material is necked down with its own weight, the process is paused to cut the fiber, seal the furnace, and attach to the take up mechanism. With metallic glass-based materials, this approach could create non-uniform material properties and create undesirable waste. Also, a continuous velocity can ease the maintenance of a thermal gradient due to higher thermal conductivity. In many instances, it can be desirable that the drawing process would reach equilibrium with minimal material loss and continue through the draw without stopping.

To achieve this, the material can be attached to a take up mechanism (e.g. a spool) prior to the start of the drawing process. The take up mechanism should be able to react to the viscosity of the material as it softens, while increasing its pulling velocity from $v_1$ to $V_{final}$. The force profile of this velocity increase must be able to both rise and fall as needed to enable equilibration.

To attach the preform to the take up mechanism, a small hole can be drilled cross wise through the very end. The loose end of a braided wire attached to the take up spool can be back fed through machine and through the drilled hole. It then follows itself back to the spool to which it is attached. That preform is now connected to the take up in such a way that enables it to be pulled through the drawing area.

The take up mechanism can be implemented using a motor with a spool. In many embodiments, it behaves as an adaptive system, e.g. by the use of a spring attached on the opposite side of a fulcrum than the take up. The take up is able to move toward the drawing zone and as it does, the force applied to the metallic glass-based material increases (e.g. the spring can be extended).

In one example, as the process starts, $v_1$ and $v_2$ are the same. The preform is fed through the drawing zone. When the end of the preform attached to the wire has exited the main heating zone (to make sure the wire doesn't just pull out of the preform), the take up is turned up to $v_{final}$. The velocity increase of the take up spool pulls the mechanism toward the drawing zone, gradually increasing the force on the composition (e.g. due to the extension if the spring). The leading end of the preform does not see the same speed increase as its velocity is the combination of the linear velocity due to the rotation of the take up minus the movement of the take up toward the metallic glass-based material. The force increases gradually, to the $F_{yield}$, and the material starts to draw. As it starts to draw, the force stops increasing, slowing the movement of the take up (increasing the velocity of the leading end to $v_{final}$). At some point the material reaches its drawing temperature profile (this is not attempted before drawing to avoid over shooting). This and the reduced cross-sectional area drop the required force needed for drawing. The spring would accelerate the take up backwards, causing an increase in $v_2$, if the fulcrum was not ratcheting, allowing movement in only one direction. The material is able to reach equilibrium and the force drops to only what is needed to draw. This can also be achieved with use of force sensors and a programmed motor controller.

While the illustrations discussed above have portrayed steady state drawing operations occurring in a horizontal arrangement, in many embodiments, materials are drawn vertically. This can be advantageous insofar as the vertical orientation can promote advantageous heat flow characteristics. Thus, for instance, FIG. 11 illustrates the drawing of a wire from a metallic glass-based material in a vertical orientation. In particular, it is illustrated that the heat emanating from the heating elements flows upward, e.g. towards the drawn material. In many instances, this can be an advantageous heat flow path, and the vertical arrangement can thereby be advantageous. For example, the heat rising can help keep the preform cool and the drawing down zone longer and more controllable. In the illustrated arrangement, the material would be drawn against gravity.

Accordingly, it is demonstrated how methods can be implemented that provide for the steady state drawing of metallic glass-based materials. But it should be clear that embodiments of the invention are not limited to the precise implementation of the disclosed techniques, rather the disclosed techniques can be augmented in any of a variety of ways in accordance with many embodiments of the invention. For example, in some embodiments, a method of drawing a high-aspect ratio metallic glass-based material further includes applying a shaping force to shape the drawn metallic glass-based material into a desired geometry. For example, in some embodiments, a metallic glass-based material is drawn through an opening that serves to shape the drawn material into a desired geometry. In a number of embodiments, the shaping force shapes the drawn material such that the finally drawn material is characterized by a flat wire-shaped geometry. In other words, the drawn material can be said to be extruded through the opening. As can be appreciated, the opening can conform to any desirable geometry. In several embodiments, a positive pressure may be applied to the fiber, e.g. to create a tube-like opening. In many such embodiments the positive pressure may be applied via an air flow, vacuum, etc.

While the above has focused on enumerating various methods for drawing high-aspect ratio metallic glass based materials, it should of course be appreciated that many embodiments of the invention also encompass apparatuses that can implement the above-described methodologies, and these are briefly described below.

Systems for Drawing High-Aspect Ratio Metallic Glass-Based Materials

In many embodiments, systems for fabricating high-aspect ratio metallic glass based materials are implemented. As can be appreciated, in a number of embodiments, systems for fabricating high-aspect ratio metallic glass-based materials are configured to implement the above-described methodologies. Thus for instance, in many embodiments, a system for drawing high-aspect ratio metallic glass-based materials includes: a preform feeder configured to advance a provided preform through a thermal processing treatment; a thermal processing treatment region configured to expose provided metallic glass-based material to a precise thermal processing regimen, and a length draw mechanism configured to continuously draw high-aspect ratio metallic glass-based material from the provided metallic glass-based material while it is being exposed the thermal processing regimen. As can be appreciated, the system can be configured to implement the above-described methodologies. For example, the thermal processing treatment region can be configured to compute and implement the desired thermal processing treatment required in order to enable a steady state drawing process, using the above-derived relationships. Additionally, while the system has been described broadly, it can of course be appreciated that the described components can be implemented in any of a variety of ways in accordance with many embodiments of the invention. For example, in many embodiments the referenced thermal processing treatment region can itself comprise: a first temperature control unit configured to heat provided metallic glass-based material to its glass transition temperature; a second temperature control unit configured to heat provided metallic glass-based material to an amount above its glass transition temperature; and a third temperature control unit configured to controllably reduce the temperature of the metallic glass-based material while it is being drawn in order to enable the desired steady state drawing process (e.g. in accordance with the methodologies described above). In many embodiments, at least one temperature control unit takes the form of the grooved roller configurations illustrated in FIGS. 9A and 9B. To be clear, while configurations including three thermal processing zones have been discussed, it should of course be clear that any of a variety of thermal processing treatment configurations can be implemented that can enable the steady state drawing of metallic glass-based materials. There can be an arbitrary number and arrangement of temperature controlling mechanisms that can be utilized to implement an effective thermal processing treatment in accordance with many embodiments of the invention. It can of course further be appreciated that systems can further be configured incorporate any of the above-described and illustrated techniques. For example, in many embodiments, the preform feeder comprises rollers for driving provided metallic glass-based material through the thermal processing treatment. In a number of embodiments, the length drawing mechanism comprises a spool configured to implement a drawing force. In several embodiments, constraining guide rollers and/or springs are implemented. In numerous embodiments, a spring is implemented that can facilitate the initiation of the drawing process. In general, as can be appreciated, any of the above-described and/or illustrated mechanisms can be implemented in systems configured to draw high-aspect ratio metallic glass-based materials in accordance with many embodiments of the invention.

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of drawing a high aspect ratio metallic glass-based material comprising:
   providing a preform of a metallic glass-based feedstock material;
   heating portions of the preform of the metallic glass-based feedstock material sequentially through at least three consecutive thermal processing regions such that different portions of the preform are exposed to different thermal processing regions simultaneously;
   wherein:
      in a first thermal processing region, at least one pre-heated portion of the preform of the metallic glass-based feedstock material is heated to a temperature at around the glass transition temperature of the metallic glass-based feedstock material;
      in a second thermal processing region, at least one heated portion of the preform of the metallic glass-based feedstock material having passed through the first thermal processing region is heated to a temperature above the glass transition temperature of the metallic glass-based feedstock material;
      in a third thermal processing region, at least one post-heated portion of the metallic glass-based material having passed through the first and second thermal processing regions is controllably reduced to a temperature around the glass transition temperature of the metallic glass-based feedstock material;
   drawing an elongated high aspect ratio metallic glass-based object from the at least one post-heated portion of the metallic glass-based feedstock material by applying a tensile force thereto, wherein the tensile force is sufficient to cause the post-heated portion of the metallic glass-based feedstock material to yield and stretch longitudinally such that the cross-sectional area of the at least one post-heated portion of the metallic glass-based feedstock material is reduced along the longitudinal length thereof; and
   wherein the metallic glass-based material retains an amorphous structure throughout its exposure to the three consecutive thermal processing regions.

2. The method of claim 1, wherein the temperature of the post-heated portions of the metallic glass-based feedstock material is reduced to a temperature around the glass-transition temperature such that for substantially every cross-sectional slice within the post-heated portion of the metallic glass-based feedstock material the product of the cross-sectional area, the rate of strain, and the viscosity, is substantially equal to one-third of the applied tensile force.

3. The method of claim 1, wherein the metallic glass-based feedstock material is moved through the plurality of thermal processing regions at a first velocity and the elongated high aspect ratio metallic glass-based object is drawn out of the post-heat portion of the metallic glass-based feedstock material at a second velocity such that product of the first velocity and the cross-sectional area of the metallic glass-based feedstock material is equal to the second velocity and the cross-sectional area of the high aspect ratio metallic glass based-object are equal.

4. The method of claim 1, wherein the heating of the portions of the metallic glass-based feedstock material induces a viscosity gradient along at least a portion of the preform of the metallic glass-based feedstock material.

5. The method of claim 4, wherein the viscosity of the at least one heated portion of the metallic glass-based feedstock material is sufficiently low such that the yield force of the at least one heated portion is less than the tensile force.

6. The method of claim 4, wherein the viscosity of each cross-sectional slice of the heated portion of the preform of the metallic glass-based feedstock material is equal to the quotient of the tensile force and the product of three time the cross-sectional area of the cross-sectional slice and the strain rate.

7. The method of claim 5, wherein the yield force along the preform is made to vary at least across the heated and post-heated portions of the metallic glass-based feedstock material.

8. The method of claim 1, wherein the drawing of the high aspect ratio metallic glass based-object is a steady-state process.

9. The method of claim 1, wherein the metallic glass-based feedstock material has a critical casting thickness of at least 1 mm.

10. The method of claim 1, wherein the metallic glass-based feedstock material is a metallic glass matrix composite.

11. The method of claim 1, wherein the cross-section of the preform of the metallic glass-based feedstock material is selected from the group consisting of prism-like, square, circular, and rectangular.

12. The method of claim 1, wherein the preform of the metallic glass-based feedstock material has a hollow center.

13. The method of claim 1, wherein the preform of the metallic glass-based feedstock material is fed through the heating portions by application of a force to the preform.

14. The method of claim 1, further comprising a start-up step wherein the velocity along the length of the preform is initially equal and the tensile force applied to the preform is increased gradually to the yield point of the material as the temperature of at least one portion of metallic glass-based feedstock material is increased to above the glass transition temperature.

15. The method of claim 1, further comprising applying a shaping force to the heated portion of the preform of the metallic glass-based feedstock material to change the final cross-sectional geometry of the elongated high aspect ratio metallic glass-based object.

16. The method of claim 1, wherein more than three thermal processing regions are used.

* * * * *